United States Patent
Schäfert et al.

(10) Patent No.: US 6,782,967 B2
(45) Date of Patent: Aug. 31, 2004

(54) STEERING BOOSTER DEVICE

(75) Inventors: Arthur Schäfert, Sulzbach (DE); Gerald Scharf, Hattersheim (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/951,716

(22) Filed: Sep. 13, 2001

(65) Prior Publication Data

US 2002/0033092 A1 Mar. 21, 2002

(30) Foreign Application Priority Data

Sep. 14, 2000 (DE) .......................................... 100 45 351

(51) Int. Cl.[7] .................................................. B62D 5/04
(52) U.S. Cl. .................................. 180/444; 74/862.321
(58) Field of Search ................................. 180/417, 426, 180/443, 444, 446; 74/388 PS; 267/186–189, 269; 73/862.321, 862.337

(56) References Cited

U.S. PATENT DOCUMENTS

| | | | | |
|---|---|---|---|---|
| 2,004,712 A | * | 6/1935 | Thiry | |
| 3,235,953 A | * | 2/1966 | Adams | |
| 3,577,778 A | * | 5/1971 | Liepins | 73/862.21 |
| 3,921,965 A | * | 11/1975 | Skerry | 267/47 |
| 4,322,062 A | * | 3/1982 | Aleck | 267/154 |
| 4,391,342 A | * | 7/1983 | Nishikawa et al. | 74/492 |
| 4,479,786 A | * | 10/1984 | De Bisschop | 464/89 |
| 4,621,701 A | * | 11/1986 | Takabayashi et al. | 180/444 |
| 4,655,092 A | | 4/1987 | Taig | |
| 4,800,764 A | | 1/1989 | Brown | |
| 5,649,467 A | * | 7/1997 | Sangret | 91/375 A |
| 5,878,832 A | * | 3/1999 | Olgren et al. | 180/444 |
| 5,969,269 A | * | 10/1999 | Munyon et al. | 73/862.328 |
| 6,378,647 B1 | * | 4/2002 | Birsching et al. | 180/444 |

FOREIGN PATENT DOCUMENTS

| | | | |
|---|---|---|---|
| DE | 197 55 044 C1 | 12/1997 | ............ B62D/5/00 |
| DE | 198 34 897 C1 | 8/1998 | ............ G01L/3/02 |
| EP | 0 053 357 | 6/1982 | ............ G01L/3/02 |
| EP | 0 570 066 A1 | 5/1992 | ............ G01L/3/10 |
| EP | 0570 066 A1 | 5/1993 | ............ G01L/3/10 |

* cited by examiner

Primary Examiner—Anne Marie Boehler
(74) Attorney, Agent, or Firm—Mayer, Brown, Rowe & Maw LLP; David M. Thimmig

(57) ABSTRACT

In a steering booster device, a torque-sensor shaft being provided between a first shaft carrying the steering wheel and a second shaft connected to the gear of the steering booster, at least one end of the torque-sensor shaft is supported flexibly in the first or second shaft by at least one damping element.

4 Claims, 2 Drawing Sheets

STEERING BOOSTER DEVICE

BACKGROUND OF THE INVENTION

The invention relates to a steering booster device, having a torque-sensor shaft being provided between a first shaft carrying the steering wheel and a second shaft connected to the gear of the steering booster.

Electric steering boosters are increasingly being used in motor vehicles. These comprise an actuating device (electric motor), an electronic control unit and a torque sensor. The torque sensor is used to measure the torque that the driver exerts on the steering shaft by means of the steering wheel. The torque-dependent deformation of the torque-sensor shaft is measured by a suitable sensor and converted into a signal, which is evaluated by the electronic control unit, the latter controlling the electric motor accordingly. A torque-sensor shaft of this kind is described in EP 0 570 066 A1, for example. The following problems can arise when integrating the torque sensor into the steering shaft.

The additional support for the steering shaft at the ends of the torque-sensor shaft can lead to stresses and unwanted bending moments given the ever-present tolerances and concentricity errors.

Another problem can arise if the torque sensor is protected by a mechanical overload stop since high accuracy of manufacture is required for the overload stop in the case of highly rigid torque sensors and even small angular errors lead to large variations in the stop torque.

Another disadvantageous effect is that vibrations are transmitted directly to the steering wheel from the engine compartment by the steering shaft.

The object on which the invention is based is therefore to eliminate these problems by simple and inexpensive means.

SUMMARY OF THE INVENTION

According to the invention, the objective is achieved by virtue of the fact that at least one end of the torque-sensor shaft is supported flexibly in the first or second shaft by damping elements. This makes it possible to reduce or avoid stresses and the occurrence of bending moments in the steering shaft.

An advantageous refinement of the steering booster device according to the invention comprises providing support by means of rubber elements. This material is well suited for flexible support and can be obtained at a reasonable cost. At the same time, damping elements made of caoutchouc and plastics, especially elastomers, are suitable.

The rubber elements furthermore isolate the steering wheel from vibrations from the engine compartment since the direct metallic connection is interrupted and the flexible connection via the rubber elements filters and reduces vibrations. This improves the level of comfort for the driver.

Another refinement of the steering booster device according to the invention envisages that both ends are supported flexibly by damping elements. This enhances the effect of avoiding and reducing vibrations on the steering wheel and further reduces the occurrence of stresses and moments in the steering column. Moreover, two flexible rubber elements at both ends of the stiff sensor shaft form a double Cardan joint that can be produced economically in large numbers.

The invention increases the permissible tolerance for the manufacture of the overload clutch since stiffness is reduced and the angle of rotation for a given torque is increased. As a result, the overload safeguard can be manufactured more economically since the angular error does not cause such a large change in the stop torque. The rubber elements are furthermore likewise protected from overloading.

In the device according to the invention, an advantageous overload stop is formed by virtue of the fact that the first and the second shaft are designed as hollow shafts in the region of the torque-sensor shaft, that an annular rubber element is arranged at the base of each cavity, and that the facing ends of the hollow shafts are designed as a dog clutch with a given play for overload prevention.

In another advantageous refinement of the invention, it is envisaged that the stiffness of the damping elements is such that the characteristic of the control loop incorporating the steering booster, the shafts and the steering wheel is tuned in an optimum manner, in particular has no point of resonance.

BRIEF DESCRIPTION OF THE DRAWINGS

The invention permits numerous embodiments. Two of these are illustrated schematically in a number of drawings by means of a number of figures and described below. In the drawings.

It should be understood that the figures are not to scale. It should also be understood that the present invention is not limited to the preferred embodiments illustrated.

DETAILED DESCRIPTION OF THE PREFERRED EMBODIMENT

Figure 1:
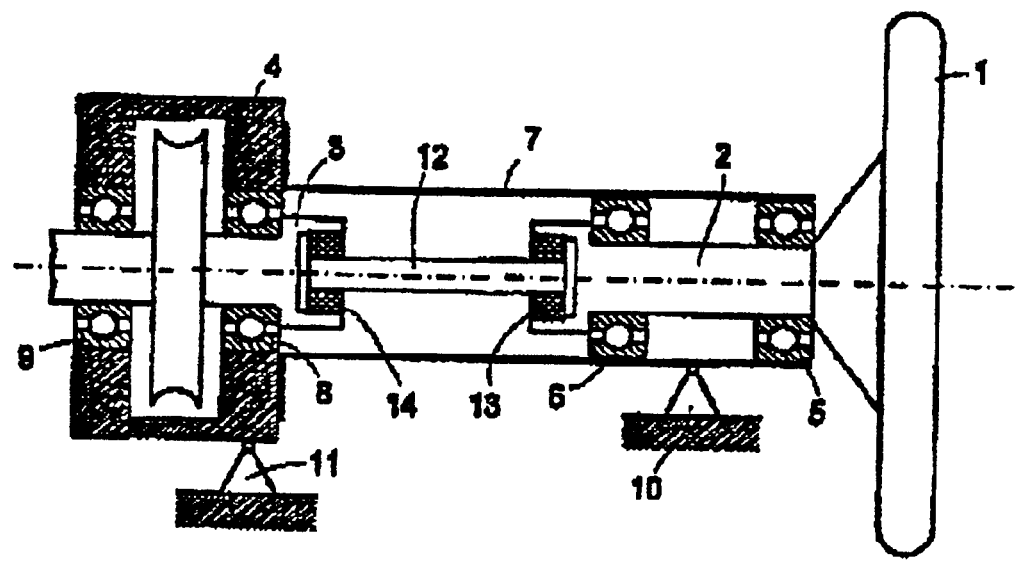
FIG. 1 shows a steering booster device according to the invention.

FIG. 1 shows the steering booster device according to the invention. The steering shaft comprises a first shaft 2 carrying the steering wheel 1—this shaft also being referred to below as the steering-wheel shaft —and a second shaft 3 arranged on the worm gear 4—this shaft also being referred to below as the steering-gear shaft. The steering-wheel shaft 2 is supported in a steering column 7 with the aid of two ball bearings 5 and 6, while the steering-gear shaft 3 is held in the gear in ball bearings 8, 9. Between the two shafts 2, 3 is the torque-sensor shaft 12, the ends of which are supported in the steering-wheel shaft 2 and the steering-gear shaft 3, respectively, by means of rubber elements 13, 14. The fixing of the device in the motor vehicle is indicated by two points of support 10 and 11.

Figure 2:
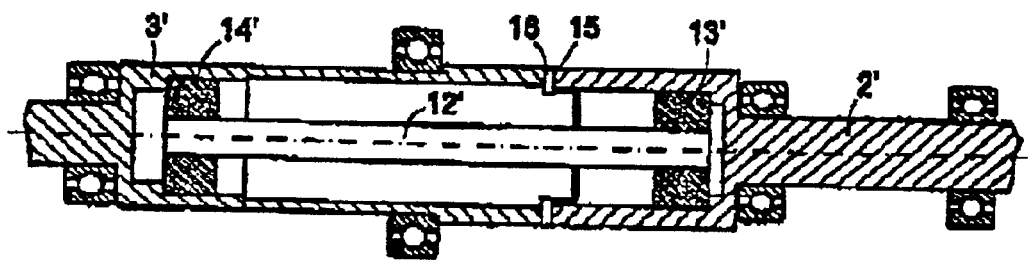
FIG. 2 shows a design according to the invention of the steering booster device with an overload safeguard.

FIG. 2 shows an exemplary embodiment according to the invention with an overload safeguard. As in FIG. 1, there are rubber elements 13', 14'0 at both ends of the torque-sensor shaft 12'. The steering-wheel shaft 2'0 and the steering-gear shaft 3'0 are designed in part as hollow shafts. The two facing ends 15, 16 of the hollow shafts form a dog clutch, which serves as an overload safeguard with a given play. In the exemplary embodiment according to FIG. 2 too, the shafts are held in ball bearings 5', 6', 8', 9'.

Figure 3:
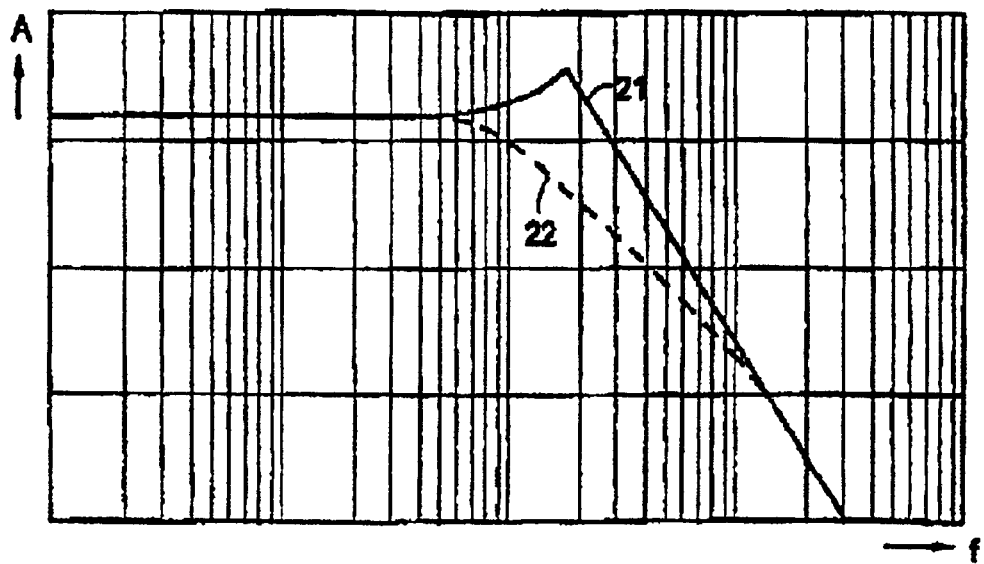
FIG. 3 shows the effect of the steering booster device according to the invention on the characteristic of the controlled system.

FIG. 3 shows the effect of the steering booster device according to the invention on the characteristic of the controlled system, the amplitude being plotted against the frequency. Curve 21 shows the profile without the use, according to the invention, of the rubber elements, with a point of resonance because of the poor damping. Curve 22 represents the profile in the case of the device according to the invention. Thanks to the good damping of the controlled system, curve 22 does not have a point of resonance.

Figure 4:
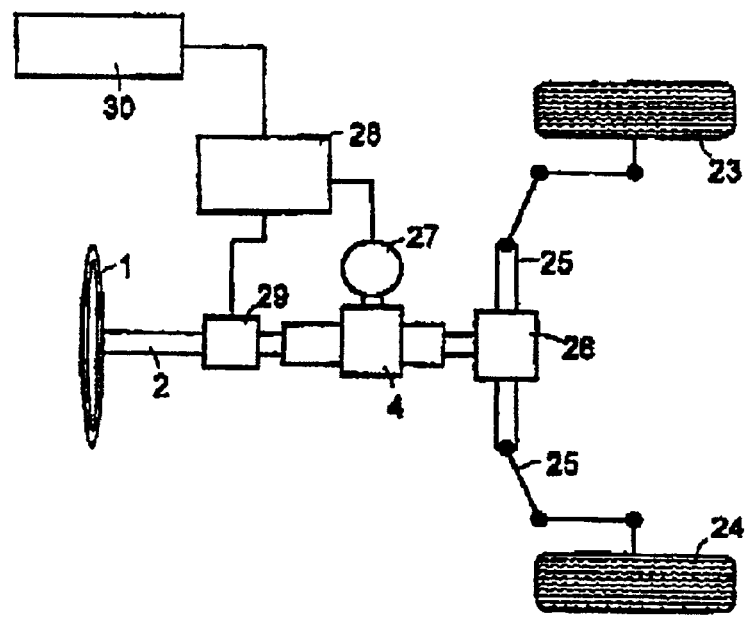
FIG. 4 shows a schematic representation of a steering system of a motor vehicle with an electric servo steering system.

FIG. 4 provides a schematic representation of the steering device of a motor vehicle with front wheels 23, 24, a steering linkage 25, a steering gear 26, which comprises a worm gear 4 in addition to the actual steering gear 26, a steering shaft 2 and a steering wheel 1. An electric motor 27, the output of which is connected to the steering shaft 2 via a worm gear 4 and is controlled in such a way by a control circuit 28 and a torque sensor 29 that it follows the commands made with the aid of the steering wheel 1 as accurately as possible, is provided as a servo steering system or steering booster. In addition, the control circuit 28 receives from the vehicle network 30 signals that describe the operating condition of the motor vehicle insofar as this is relevant to the servo steering system.

Although reference has been made, for the purpose of explanation, to preferred embodiments of a steering booster device, it should be understood that any of a variety of components and suitable materials of construction and dimensions may be used to satisfy the particular needs and requirements of the end user. It will be apparent to those skilled in the art that modifications and variations can be made in the design and construction of the steering booster device without departing from the scope or spirit of the invention. Other embodiments of the invention will be apparent to those skilled in the art from consideration of the specification and practice of the invention disclosed herein.

What is claimed is:

1. In a steering booster device, a torque-sensor shaft being provided between a first shaft carrying a steering wheel and a second shaft connected to a gear of the steering booster, wherein at least one of two ends of the torque-sensor shaft is supported flexibly in the first or second shaft by at least one damping element that is made at least in part of rubber and that interrupts an otherwise direct metallic connection between the first and second shafts to dampen vibrations and reduce bending moments in the shafts.

2. In a steering booster device, a torque-sensor shaft being provided between a first shaft carrying a steering wheel and a second shaft connected to a gear of the steering booster, wherein both ends of the torque-sensor shaft are supported flexibly in the respective first and second shafts by damping elements that interrupt an otherwise direct metallic connection between the first and second shafts to dampen vibrations and reduce bending moments in the shafts.

3. The device of claim 2, wherein the damping elements are made at least in part of rubber.

4. The device as claimed in claim 2, wherein the first shaft and the second shaft each have a hollow portion in the region of the torque-sensor shaft, wherein an annular rubber element is arranged in the hollow portion of each of the first and second shafts, and wherein the hollow portion of each of the first and second shafts terminates in an end with said ends facing each other and forming a dog clutch with a predetermined play for overload prevention.

* * * * *